May 20, 1958     S. BILKER ET AL     2,835,169
SIDE AND REAR VIEW MIRROR
Filed July 2, 1954
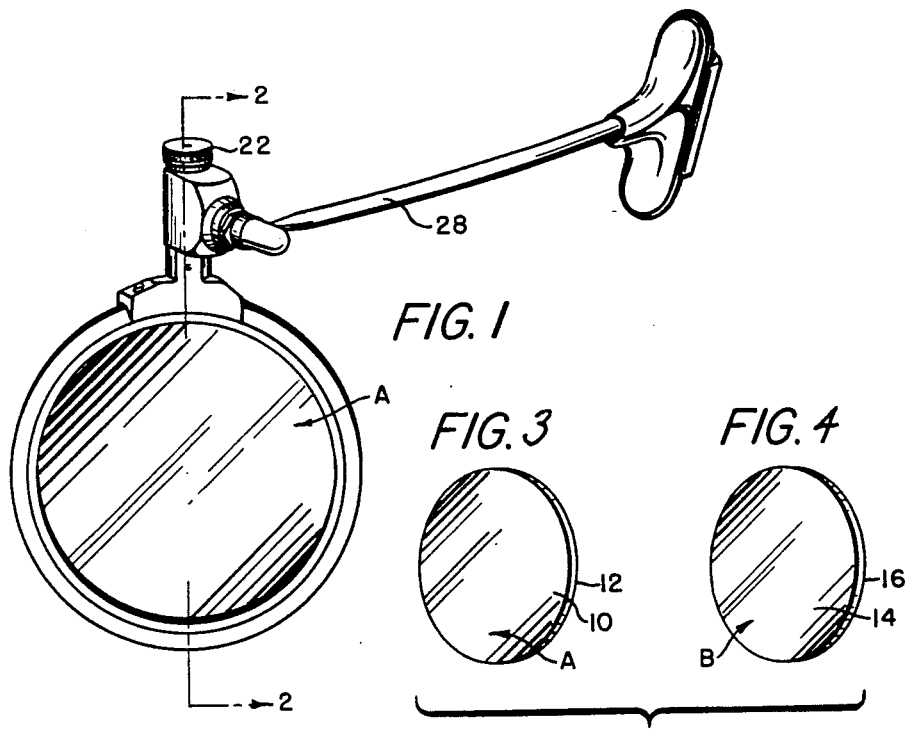
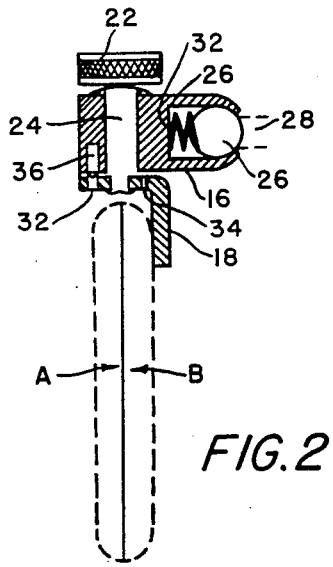
INVENTORS
STANLEY BILKER
HARVEY BARTON
BY
Harry Langsam
ATTORNEY

United States Patent Office 2,835,169
Patented May 20, 1958

2,835,169

SIDE AND REAR VIEW MIRROR

Stanley Bilker, Havertown, Pa., and Harvey Barton, Grenlock, N. J., assignors to O & S Research, Inc., Philadelphia, Pa., a corporation of New Jersey Application July 2, 1954, Serial No. 440,892

1 Claim. (Cl. 88—77)

This invention relates to vehicular side and rear view mirrors which present for day driving a clear vision of an object behind the driver, and for night driving provides for the location of other automobiles to the rear without glare disturbances caused by the light illumination of headlights.

The general purposes of this invention is to provide for a simple and inexpensive device which will permit a sufficiently bright image of rearward located objects to be ascertained by the driver without glare annoyances during periods when the beams of headlamps are directed into the operator's eyes, and yet permit the use of full high efficiency reflected vision during daytime operation. This device completely eliminates the necessity of partial reflectance coatings which depreciate the intensity of daytime illumination. Our invention further excludes the necessity of manufacturing relatively close tolerance prismoidal or wedged mirrors which at best would induce multiple and confusing images of overhead street lights as well as reflections from the roadway, all of which may be apparently superimposed or infringed upon the main object. This problem is peculiar to side view mirrors of the wedge type, since a mirror located on the side of an automobile is not shadowed or "tunnelled" by the effect of the interior of the car body.

The principal object of this invention is to provide as a reflector, a transparent disc or plate of glass whose surfaces are essentially parallel. Because of the phenomenon of refraction, each glass-to-air interface will provide a low efficiency reflection of any incident beam imposed upon the surface. By computation from Fresnel's law:

$$\frac{I}{I_0} = \frac{(N-1)^2}{(N+1)^2}$$

a single glass surface reflects approximately 4.25 percent of the light falling normally upon it, and transmits the remainder with the exception of a small portion which is absorbed by the glass medium itself.

Since we have two surfaces on the glass plate, it is possible to have reinforcement of the reflections from each surface to produce an effective resultant total reflection of 8.5 percent. In addition, there are a plurality of reflections between these two surfaces which result in the production of what may be classified as a series of tertiary images. Where the reflective power of a back surface, metallic reflector is very high, the brightness of any secondary images will be ignored by the eye. However, where the intensity of the two reflected beams are in the same order of magnitude, then the secondary and tertiary images not only become apparent, but also may occasion dangerous confusion unless this effect is eliminated.

The most satisfactory method of accomplishing this is to fabricate or select the polished glass plates so that the secondary and tertiary images are so nearly superimposed on the primary image that the eye is not capable of distinguishing these as separate images.

The angular resolving power of the eye is said to be for objects of a good degree of illumination approximately 1 minute or 60 seconds of arc without magnification. However, where the intensity of illumination drops, the capacity of the eye to perceive and separate details decreases in the order of the square root of the illumination. Our observations and experiments on the plane glass reflector indicate that a materially greater angular separation is permissible without confusion, and multiple reflections separated by an angle as much as 6 minutes caused no difficulty whatsoever to a group of twelve drivers. It would, therefore, appear to be appropriate to control the wedge angle of inclination of the two polished surfaces of the glass plate to not more than 2 minutes of angle. That is, a relationship between the angle of inclination of the polished surfaces and the primary reflections from each surface bears a ratio of approximately one-to-three because of Shell's law and the law of light reflection.

In this connection, commercially available glass is readily obtained which will meet the two minute wedge angle specification and, therefore, a cheap and abundant supply may be procured for our device.

The secondary purpose of our invention is to provide a simple and inexpensive mounting for a rear or side vision mirror which permits a two position manually operated arrangement for an immediate conversion from day to night driving or from high reflection, efficient bright illumination to low intensity, non-glare by a mere flick of the fingers. Thus, we propose to have a fully adjustable mirror device which may be varied almost continually in position for a wide range of drivers, but for any particular driver an instant conversion to non-glare driving is immediately obtainable. Thus, our composite rear vision device is so mounted that it can be instantly rotated on its vertical axis to present either face rearward without additional adjustment for levelling.

Fig. 1 illustrates the principle of the non-glare reflecting device and how the multiple reflections of street and road light images may be obviated.

Fig. 2 demonstrates the principles of mechanical structure for mounting the quick positioning self adjusting mount.

Fig. 3 is a perspective view of a non-glare reflecting element embodied in our invention.

Fig. 4 is a perspective view of a full reflecting element embodied in our invention.

Fig. 5 is a side view of the non-glare element.

Fig. 6 is a sectional view of the full reflecting and non-glare elements with the non-glare element facing the left of the drawing.

Fig. 7 is a sectional view similar to that of Fig. 6 with the full reflecting element facing the left of the drawing.

Referring now in detail to the drawings, wherein similar reference characters refer to similar parts, we show a rear view mirror adapted to view objects in the rear or on the side of a vehicle. This mirror is adapted to view objects during daylight, when a high reflective coating surface is utilized; and for night driving, a clear glass plate is used which utilizes two polished glass substantially parallel surfaces.

A non-glare mirror, generally designated as A, comprises a transparent plate or disc having two substantially parallel surfaces 10, 12, wherein the relative angular inclination between the two surfaces 10, 12 is not more than 2 minutes or 120 seconds of arc.

A second mirror, generally designated as B, has two substantially parallel surfaces 14, 16. One surface 14, adapted to be located immediately adjacent the surface 12, has therein a high reflectance aluminized or silvered surface, covered or backed by a black, or other suitable color for decorative purposes, background of light absorbing material. The blackened coating faces the clear surface 12, and the aluminized or silvered coating faces the clear surface 16.

In operation, the vehicle operator views the mirror A (Fig 3) for night driving (to view objects in the rear), wherein a small amount of light is reflected, and for day driving the vehicle operator flips over the combined mirrors A and B so that the operator views the mirror B, wherein a large amount of light is reflected.

The mirrors are pivotally mounted upon a bracket 18, which is connected to a pivot or shaft 20, that may be rotated by a thumb grip or handle 22, served to the upper end of the shaft 20. The shaft 20 is rotatably mounted within a journal box 24, which is mounted upon ball encircling extension 26. A ball 28, mounted to a bracket arm 28, is secured in position by an internally located spring 30, which presses against the extension wall 32, and the ball 28 to keep the two members, to wit—the ball 26 and the extension 26—in any position selected by the vehicle operator.

To rotate the mirrors A and B on their vertical pivot 18, and to hold the mirror in position, we provide a pair of recesses 23, 24 spaced 180° apart, on the bracket 18. Each recess 33, 34 is adapted to be engaged by a spring pressed pin 36 or ridge. By turning the handle 22, the non-glare uncoated polished mirror A may be stopped when the pin 36 or ridge engages the opening 32 for night driving, and for day driving the high reflectance mirror B may be used when the handle 22 is rotated to bring the recess 34 and the pin 24 in register.

By utilizing our invention for night driving, the vehicle operator will not be annoyed by headlamps which may be reflected into the operator's eyes, and still the operator will be able to sufficiently view rearwardly located objects. The invention will permit the use of full high efficiency reflected vision during daytime operation.

The mirror A having two substantially parallel surfaces will provide a low efficiency reflection of any incidence beam upon the surface at an angle of 90 degrees to a normally incident beam. The reinforcement of the reflections from each surface produces an effective total reflection of 8.5 percent which is sufficient for night driving.

Although our invention has been described in considerable detail, such description is intended as being illustrative rather than limiting, since the invention may be variously embodied, and the scope of the invention is to be determined as claimed.

We claim as our invention:

A reversible side view mirror comprising a polished sheet of glass having one silvered side backed with an opaque coating, a second transparent sheet of glass having two polished surfaces, the relative angular inclination of which is not greater than 2 minutes of arc, abutting said opaque coating, a frame surrounding all of the edges of said sheets of glass, a bracket mounted upon said frame and having a pair of recesses spaced 180 degrees apart, a shaft secured to said bracket centrally located with respect to said recesses and rotatably supported within a single journal box, said journal box having an integrally formed, laterally located, socket extension engaging a ball affixed to a bracket arm for adjusting the mirror position, a spring within said socket extension resiliently pressing against said ball, and a spring pressed pin extending from said journal box and adapted to engage either of said spaced recesses, and a knuried thumb knob on said shaft whereby the mirror may be rotated 180 degrees by a twist of the fingers without disturbing its adjusted position.

References Cited in the file of this patent

UNITED STATES PATENTS

| Number | Name | Date |
| --- | --- | --- |
| 1,276,512 | Foure | Aug. 20, 1918 |
| 1,513,769 | Sullivan | Nov. 4, 1924 |
| 1,755,740 | Linn | Apr. 22, 1930 |
| 1,776,496 | Eiland | Sept. 23, 1930 |
| 1,876,319 | Smith | Sept. 6, 1932 |
| 1,949,138 | Bell | Feb. 27, 1934 |
| 1,964,626 | Fotakis | June 26, 1934 |
| 2,037,303 | Battee | Apr. 14, 1936 |
| 2,087,531 | Sands | July 20, 1937 |
| 2,307,532 | Murphy | Jan. 5, 1943 |
| 2,442,504 | Miller | June 1, 1948 |
| 2,631,498 | Barkley | Mar. 17, 1953 |